United States Patent [19]

Fisher et al.

[11] Patent Number: 6,075,628
[45] Date of Patent: Jun. 13, 2000

[54] FAULT LOCATION IN OPTICAL COMMUNICATION SYSTEMS

[75] Inventors: David Anthony Fisher, Saffron Walden, United Kingdom; Kim Byron Roberts, Kanata, Canada

[73] Assignee: Nortel Networks Corporation, Montreal, Canada

[21] Appl. No.: 08/793,629

[22] PCT Filed: Aug. 15, 1995

[86] PCT No.: PCT/GB95/01918

§ 371 Date: Aug. 22, 1997

§ 102(e) Date: Aug. 22, 1997

[87] PCT Pub. No.: WO96/05665

PCT Pub. Date: Feb. 22, 1996

[30] Foreign Application Priority Data

Aug. 17, 1994 [GB] United Kingdom .................... 9416661

[51] Int. Cl.[7] .............................................. H04B 10/12
[52] U.S. Cl. ........................................... 359/110; 359/161
[58] Field of Search .................................. 359/110, 139, 359/161; 356/731

[56] References Cited

U.S. PATENT DOCUMENTS

| | | | |
|---|---|---|---|
| 5,177,354 | 1/1993 | Tomita et al. | 356/73.1 |
| 5,187,362 | 2/1993 | Keebie | 356/73.1 |
| 5,321,541 | 6/1994 | Cohen | 359/127 |
| 5,491,573 | 2/1996 | Shipley | 359/110 |
| 5,528,404 | 6/1996 | MacKichan | 359/110 |
| 5,570,217 | 10/1996 | Fleuen | 359/110 |
| 5,859,716 | 1/1999 | O'Sullivan et al. | 359/110 |

FOREIGN PATENT DOCUMENTS 2 272 608   5/1994   United Kingdom .

*Primary Examiner*—Leslie Pascal
*Attorney, Agent, or Firm*—Lee, Mann, Smith, McWilliams, Sweeney & Ohlson

[57] ABSTRACT

An optical transmission system comprises a transmitter and a receiver linked by an optical path having amplifier stations and incorporating a reflectometer for determining the location of an optical fault in the path. Transmitted signals are tapped from the path at an amplifier station and are processed by a correlation technique to detect the relative timing of reflections from a fault and thereby to determine the location of that fault.

20 Claims, 4 Drawing Sheets

FAULT LOCATION IN OPTICAL COMMUNICATION SYSTEMS

This invention relates to optical communications systems and in particular to the provision of time domain reflectometry to effect fault detection and location in such systems.

Optical time domain reflectometry (OTDR) is a well known technique used to determine the location of discontinuities in the impedance of a transmission medium (e.g. optical fibre wave guide, coaxial cable) by the measurement of the amplitude and delay of reflections of a travelling wave generated by the discontinuities. A description of OTDR is given in IEEE Journal of lightwave technology, Vol. 17 No. Aug. 8, 1989, pp1217 to 1224, and in specification No. WO-93/07687. This technique has been used to locate faults and breakages in the transmission medium. Conventionally, the travelling wave is generated by a short impulse, the amplitude, rise time and width of which combined with the bandwidth of the transmission medium and sensitivity of the reflection detection process determine the performance (resolution) of the method.

At present, time division reflectometry employs separate test equipment and requires a means of coupling this shared equipment into the access fibres. The use of the technique in the recently introduced passive optical network (PON) systems has been limited by considerations of cost and complexity. In particular, certain network operators require that reflectometry be performed at a wavelength different from the transmission wavelengths so as to ensure that the reflectometry testing does not interrupt normal data transmission within the network. This requires the installation of costly filter equipment and introduces consequent losses into the network.

The object of the invention is to minimise or to overcome this disadvantage.

According to one aspect of the invention there is provided an optical communications system including a data transmitter, a data receiver, and incorporating a time division reflectometry fault location arrangement, the system including means for transmitting a downstream data sequence having statistical properties equivalent to a continuous random binary sequence, means for generating an upstream data sequence orthogonal to the downstream data sequence, said upstream sequence having quiet periods containing no data, means for generating a time delayed copy of the downstream data sequence, means for correlating said time delayed copy during said quiet period with an echo of the downstream data sequence reflected from a fault, and means for adjusting said time delay whereby to achieve said correlation and to determine the location of said fault.

According another aspect of the invention there is provided a method of fault location in an optical communications system, the method including transmitting a downstream data sequence having statistical properties equivalent to a continuous random binary sequence, generating an upstream data sequence orthogonal to the downstream data sequence, said upstream sequence having quiet periods containing no data, generating a time delayed copy of the downstream data sequence, and correlating said time delayed copy during said quiet period with an echo of the downstream data sequence reflected from a fault.

In this technique, random or cyclic sequences are transmitted in place of single impulses, the reflections of the sequences being detected by a correlation process. The use of a pseudo random sequence enables reflections to be located up to the duration of the sequence length. This method has the benefit that the correlation between the launched and reflected signal may be performed over a greater proportion of the time than is generally possible for an impulse based system, and additionally, that the properties of the test signal may be designed to optimise the detector characteristics. This enables very high sensitivities to be achieved with relatively low cost optical laser and receiver components. It thus becomes practical to use a near conventional transmitter design and near conventional data receiver design such that the fault location system may be combined with the normal data transmit and receive functions, with a time resolution of the order of a meter.

In our arrangement and method, the transmitted data itself is used as test sequence. The receiver is provided with the ability to detect reflections using either (i) a correlation window noise tracking algorithm or (ii) by de-composition requiring the subtraction of an estimate of the transmitter primary interference path.

In a second embodiment, a passive optical ranging method is employed to produce a system capable of detecting the loop delay of discontinuities in the fibre and hence determining cable breaks inferred by significant changes in the reflection of information. In this embodiment the pseudo random sequence may be launched at a level below that which would otherwise affect the error free detection of normal data transmission.

Embodiments of the invention will now be described with reference to the accompanying drawings in which.

Figure 1:
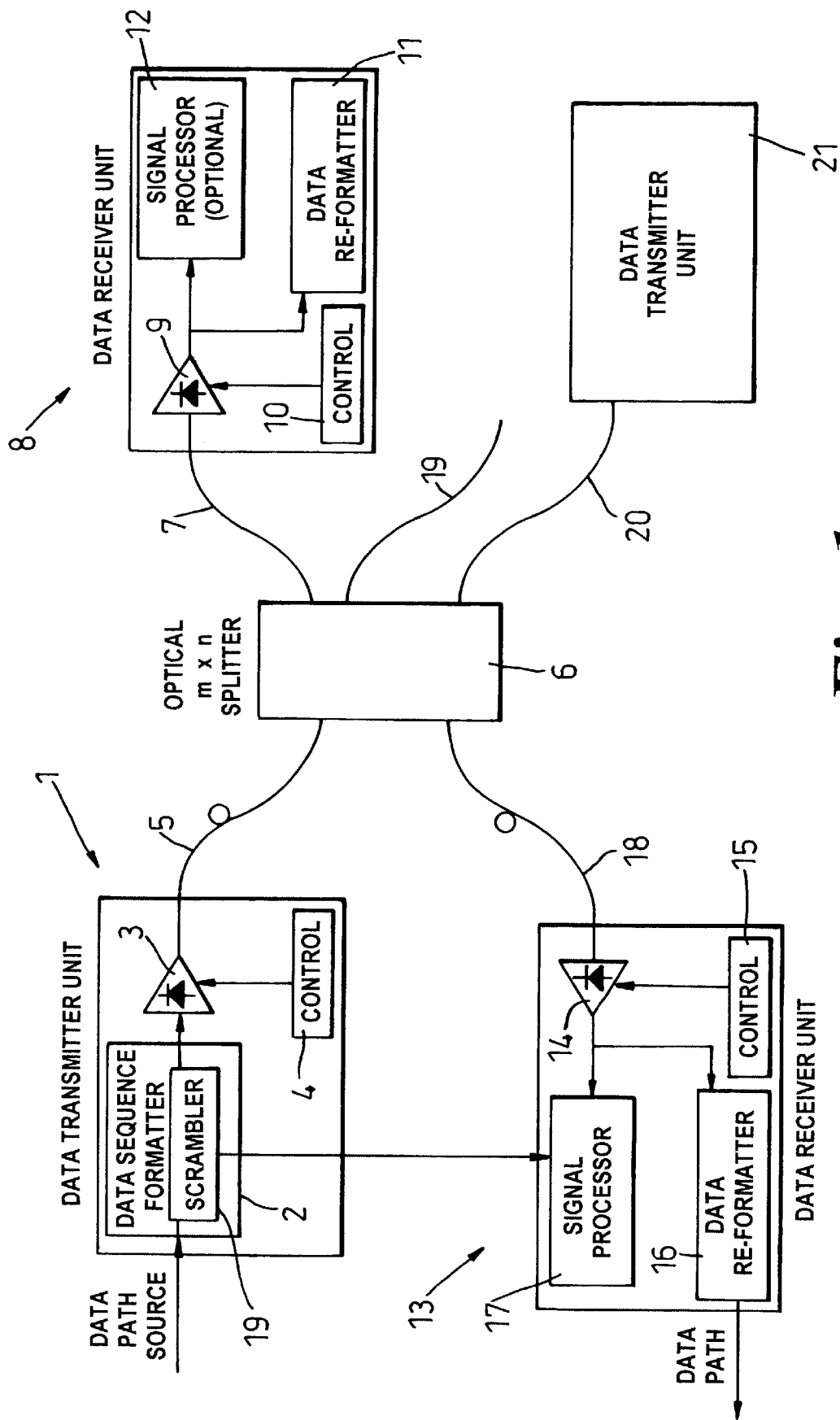
FIG. 1 is a schematic diagram of an optical transmission system incorporating fault location equipment according to the invention.

Referring first to FIG. 1, the transmission system includes a data transmitter unit 1 containing a data sequence formatter 2, an optical transmitter 3 and an associated controller 4. The data transmitter unit is coupled via a fibre 5 to a passive optical splitter 6 and through a further fibre path to an optical receiver 7 and data receiver unit 8. The data receiving unit comprises an optical receiver 9 with its controller 10 and a data re-formatter 11, providing data re-formatting as required for the next stage in the data path. The optical splitter allows optical signals to be combined and separated using optical wave guides, and has the additional property that the optical signal coupling is directional so that backward reflections due to the splitter itself, are typically one tenth or less in amplitude in comparison with the forward travelling light, this property applying to both transmission directions.

On the upstream side of the system, a data receiver unit 13 is placed on a second fibre 18 connected to the left hand side of the splitter allowing it to see reflections from output ports of the splitter and fibre network to the right of the splitter (and any other upstream data source). This receiver signal processing unit contains an optical receiver 14, a controller 15, a signal processor block 17 and may also contain a data re-formatter block 16. Thus, the splitter 16 performs a function of retrieval of signals, including a reflection of the transmitted data sequence from a fault, from the transmission path.

In the arrangement of FIG. 1, the data transmitter unit 1 sequence source formatter contains a data scrambler 19 which scrambles the data such that the downstream transmitted data sequence has statistical properties equivalent to those of a continuous random binary sequence. This allows the transmitted data itself to be used in the correlation process, this transmitted data being orthogonal to the upstream data which is also randomised. An upstream data formatter 21 which contains the same functions as the data transmitter unit 1 may transmit an upstream data sequence that leaves a segment, i.e. one or more time slots, of the upstream frame unused or reserved specifically to provide a quiet period in which the data receiver unit 13 can calculate the correlation coefficient between a delayed version of the transmitted data sequence from the transmitter unit 1 and potential reflections of it arising from discontinuities in the fibre at the splitter or to the downstream side of the splitter.

Figure 2:
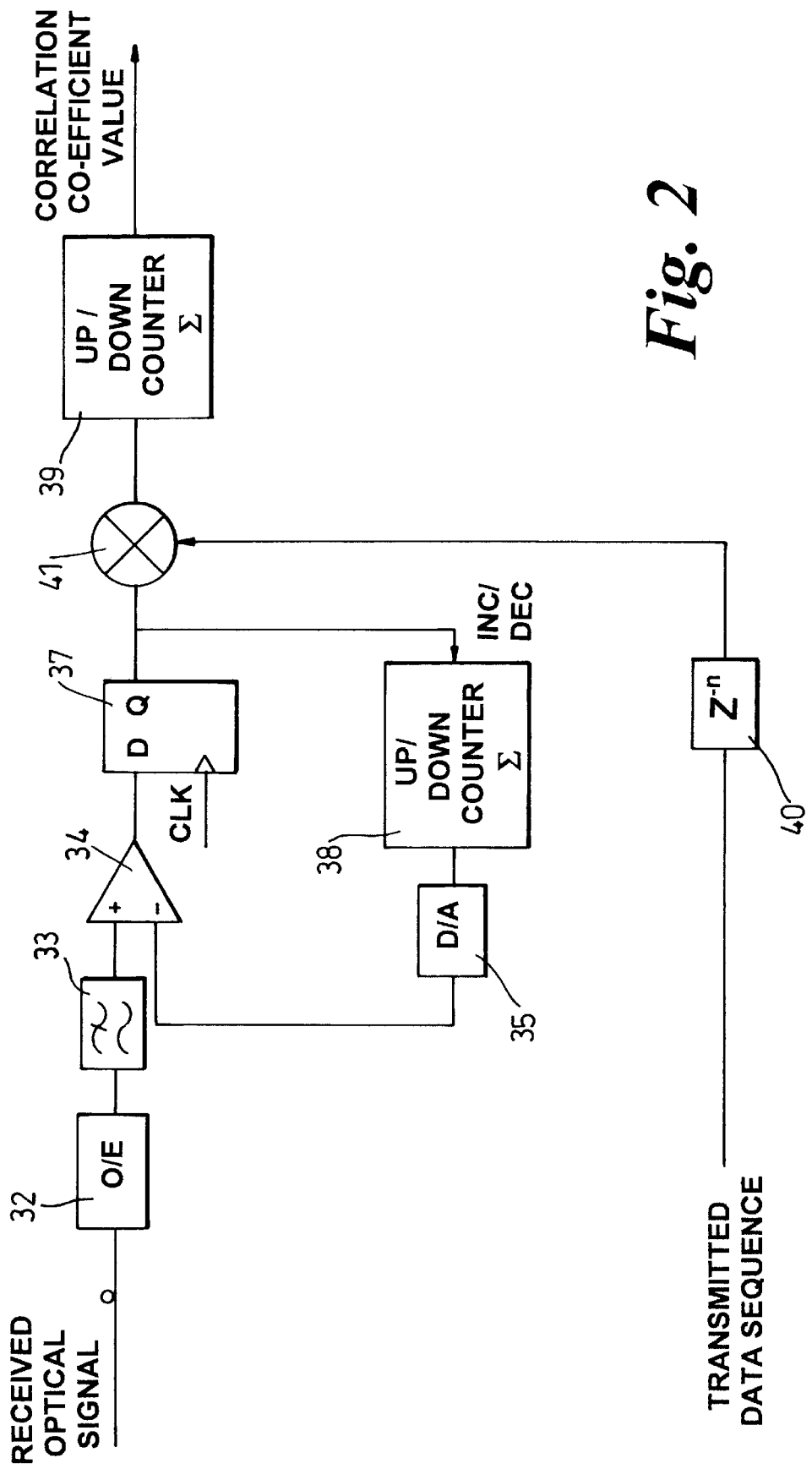
FIG. 2 shows a receiver signal processor function of the system of FIG. 1.

The signal processor function 12 is illustrated in further detail in FIG. 2, includes an optical to electrical conversion function 32 which converts the optical input signal into a voltage proportional to the optical power. After a low pass filter 33 to remove noise outside of the frequency band of the unwanted signals there is a DC balancing circuit comprising a comparator 34, a digital to analogue converter 35, a first up/down counter 36 and a D-type flip-flop 37. which adjusts the threshold level of the D/A comparator converter 35 to a value resulting in a substantially equal number of ones and zeros. This circuit is only active during that part of the frame in which there is no signal other than reflections from the fibre discontinuities, consequently the noise level of the receiver will in practice be of greater amplitude than the signals reflected.

The product of the data sequence is formed by the digital multiplier 41 from the data sequence delayed by n clock cycles and the digitised data output from D-type flip-flop 37 and is integrated using an up down counter 39). By varying the value of the delay $Z^{-n}$ 40, the output of the up down counter 39 gives the correlation between the signal received as the upstream fibre and the downstream transmitted signal and hence directly allow measurement of reflections with a resolution approximately equal to one bit at the data clock rate.

For accurate control of the decision threshold of the D-type flip flop 37 it is advantageous if the up-down counter used to drive the D to A converter has a step size that is a fraction of the D/A resolution (for example one sixteenth) in order that wander of the threshold value due to random noise does not dominate the decision process. In practice the noise level with no signal will be greater than the reflections due to cable discontinuities.

FIG. 1 shows how a receiver unit may be configured to provide the means for calculation of the amplitude of upstream reflections from the downstream signal path. In the case where there is not a transmitter on the downstream side of the splitter, this unit is then serving no purpose other than time domain reflectometry. Further receiver units may be added on the downstream side of the splitter to produce a simplex point to multipoint system and a separate fibre network provided for upstream. Alternatively the directional properties of the splitter may be sufficient to provide for duplex transmission in which case the receiver unit may be used both for time domain reflectometry and data reception and data transmitter units 21 employed.

Figure 3:
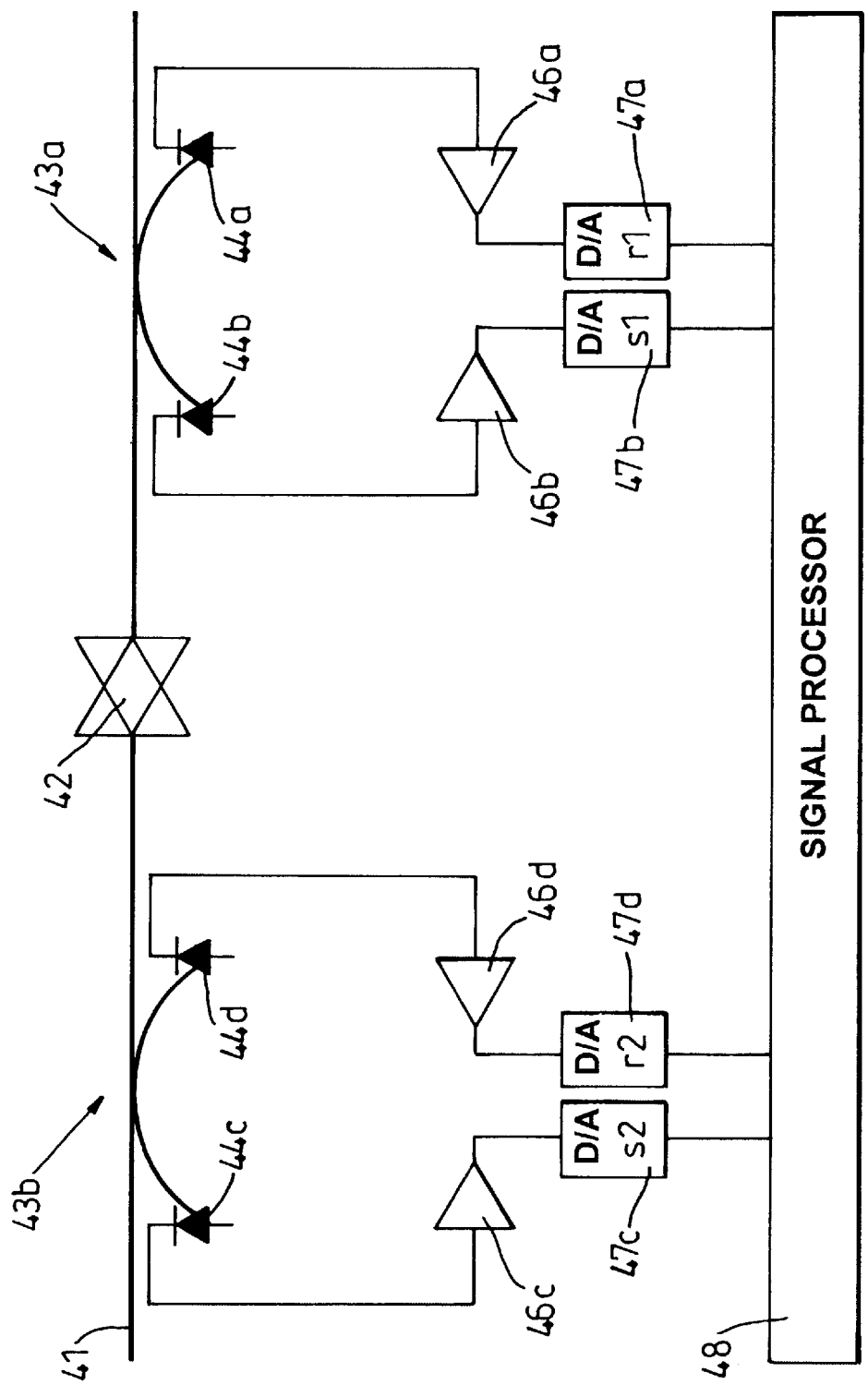
FIG. 3 shows a method of coupling the receiver signal processor function of FIG. 2 to a bidirectional amplifier station.

Referring now to FIG. 3, this illustrates the manner in which the reflectometry arrangement is coupled to the optical path at an amplifier station As in the arrangement of FIGS. 1 and 2, the transmitted data is used as the test signal. The reflectometer is coupled to an optical transmission path 41 on either side of a bidirectional amplifier 42 using the four port taps 43a, 43b that are provided for monitoring the amplifier performance. Typically the taps remove about 5% of the power being transmitted along the fiber path. The taps thus perform a function of retrieval of signals, including a reflection of the transmitted data sequence from a fault, from the transmission path.

In a bi-directional amplifier, signals are present, in different optical wavelength bands, in the forward and reverse directions. A four port tap is provided at both ends of the amplifier to monitor the input and output signals, and to perform analog maintenance in both directions. The reflection measurement calculations can then be done in both directions. If the signals in the two directions are correlated, then interference can be produced in the reflection array. Known correlations, such as the SONET frame patterns, can be eliminated by zeroing those frequency components. Other signals may require more complex compensation using all four data arrays, or even the maintenance procedure of removing or changing one signal to prove that the result is not an artefact of signal correlation. Changing one signal e.g. to SONET AIS would eliminate its data content and break the uncompensated correlations.

The output ports of the taps 43a, 43b are coupled each to a respective photodetector, e.g. a PIN diode 44a, 44b, 44c and 44d. The currents from the PIN photo diodes are amplified and band limited (~0 to 5 MHz) by respective transimpedance amplifiers 46a, 46b, 46c and 46d whose outputs are coupled each to a respective fast analogue to digital converter 47a–47d. The output signals from the respective analogue to digital converters are referred to below as the r1, s1, r2 and s2 signals. The fast, typically about 10 MHz, analogue to digital converters 47 simultaneously sample the levels of the outgoing and incoming optical signals and pass the resulting arrays of data to a signal processor 48 whereby the Fast Fourier transforms of the signals are computed, divided, and then Inverse Fast Fourier Transformed to produce a reflection array. The elements of this array r(n) correspond each to the reflection from a location at a distance n*ΔL down the fibre, plus noise and interference. The largest reflections can be compared to thresholds, e.g. to generate alarms, and can be displayed to the user via the transmission system's software.

Since the stimulus signal s(t) consists of all the low frequency optical signals present, the dominant noise term is the locally generated thermal noise. Improved sensitivity is achieved by lengthening the time span of the stimulus signal.

The resolution of the distance is inversely proportional to the bandwidth of the stimulus signal. For a bandwidth of 5 MHz and assuming Nyquist sampling, a resolution of about 20 meters can be achieved. The spatial resolution can be improved by faster sampling or by phase correlation signal processing techniques to resolve better than one sampling interval. Note that this resolution depends on an acceptable autocorrelation function for the particular stimulus signal. This autocorrelation function can be computed as a check for the acceptability of the particular s(t) as a stimulus signal.

One problem with using the on-line data signal as the stimulus is the possible correlation with the previous data signal giving rise to ghost reflections. Correlating the current stimulus with previous stimulus signals is one way to check for this phenomenon. If a significant correlation with a previous stimulus is detected, then the present stimulus is rejected. Note that lengthening the time span of a stimulus reduces the likelihood of this kind of correlation.

The noise depends upon the amount of signal variation in the relevant frequency band (0–5 MHz) and the amount of averaging or filtering done to the results. The dither that is applied for analogue maintenance helps to ensure that there is low frequency content. The resolution of the distance depends upon the sampling frequency. For example, a sampling frequency of 10 MHz produces a ΔL of 100 ns divided by 5 ns/m, equivalent to a 20 m round trip, or 10 meters one way. The spatial resolution can be improved by faster sampling or by phase correlation signal processing techniques to resolve better than one sampling interval.

By providing the bidirectional optical amplifier with isolators in the two different wavelength paths to restrict the direction of propagation of particular wavelengths, then the information from all four monitor ports can be used to compensate for signal correlations (where F represents the fast Fourier transform).

If $r1(t)=F^{-1}[F\{b\}/F\{a\}]$ and $r2(t)=F^{-1}[F\{d\}/F\{c\}]$ for the two directions, then the correlation of b and c can be subtracted from b to remove those elements in the frequency band travelling in the other direction, and similarly the correlation of d and a can be subtracted from d.

$r1=F^{-1}[F\{b\}-F\{c\}*\text{scale})/F\{a\}]$

Where 'scale' is the correlation of b and c divided by the RMS value of c.

Known reflections, such as those originating from within the amplifier can be calibrated in the factory, and then dynamically calculated as a function of the amplifier gain and subtracted off.

Another interference compensation method is to examine the spectrums $F\{b\}$ an $F\{c\}$, and zero or attenuate $F\{b\}$ at those frequencies where $F\{c\}$ is above a predetermined threshold relative to $F\{b\}$. This reduces the number of components that may interfere.

Figure 4:
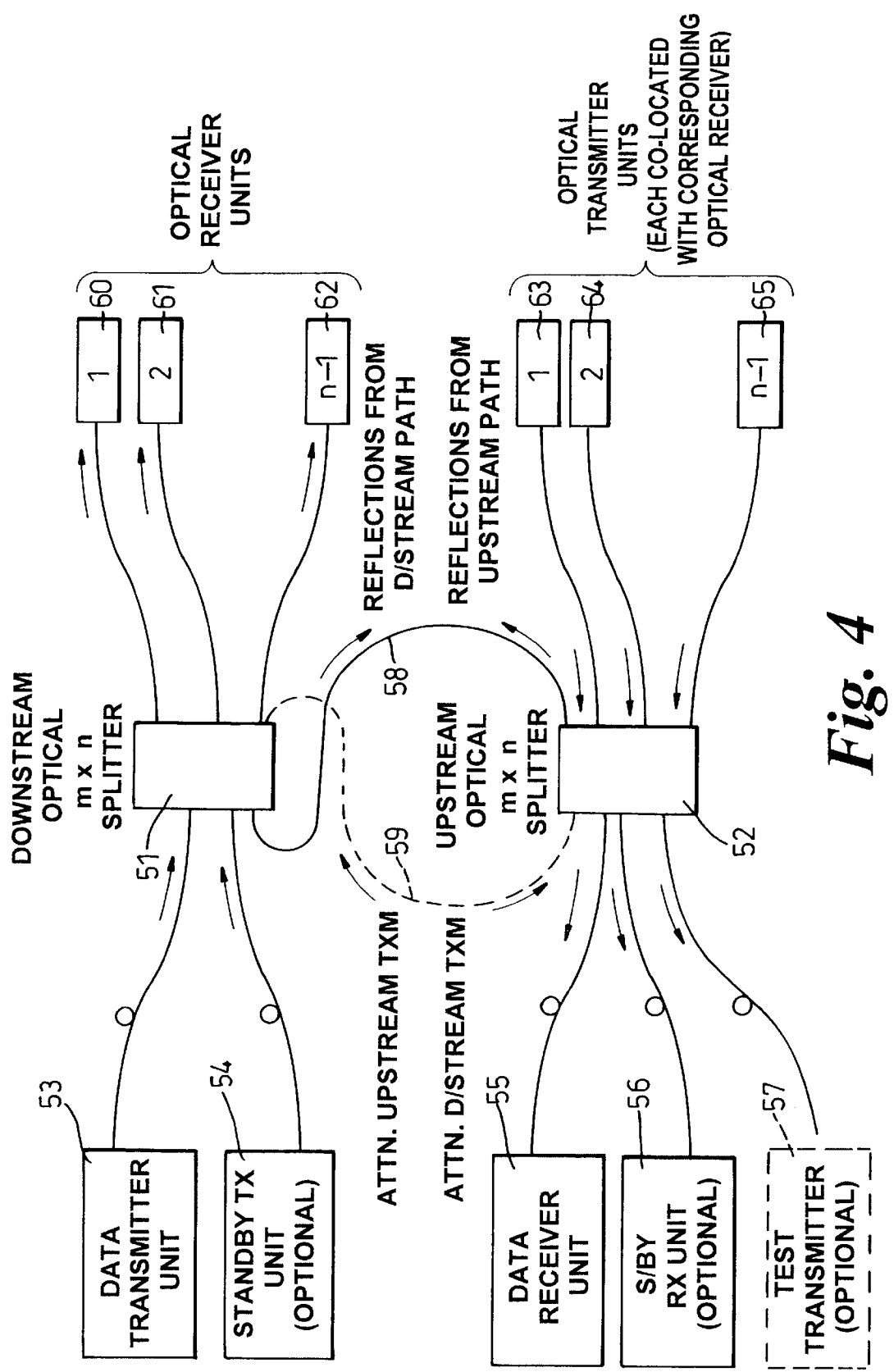
FIG. 4 shows a further network arrangement.

A further development allowing simplex operation combined with time domain reflectometry is shown in FIG. 4. In this case two splitters (51, 52) are employed, one for each transmission direction. A path 58 is provided for reflections from the downstream path to enter one leg of the upstream path. This will incur attenuation dependent on the upstream splitter loss and this could be increased as necessary to ensure that under no circumstances would a reflection from the downstream path compromise the performance of the upstream path.

Similarly, reflections from the upstream path can enter the downstream path in the same way via path 59, but will be equally attenuated.

Reflections in the upstream path to the left of the splitter in FIG. 4 may be determined using the same method as described employing one of the downstream optical receiver units and a downstream marshalling technique e.g. as described in our specification No GB-A-2272608. In this case the data captured in this window would be correlated with the data received at the upstream receiver unit on the upstream side of the diagram to move all processing functions to the upstream side forming the head end of a passive optical network system.

A second method is to introduce a path between the downstream and upstream splitter in which by virtue of the downstream splitter loss (typically 15 dB for a 32 way splitter), any attenuated remnant of the downstream data is transmitted towards the transmitter units on one downstream side of the diagram. In this case reflections from any discontinuity between the splitter and one downstream side optical transmitter units will pass back through the upstream splitter and arrive at the data receiver unit 55 (and the standby data receiver unit). Additional attenuation could be placed in the inter coupler path in order to eliminate the downstream signal on the upstream fibres compromising the performance of the transmitters (63, 64, 65) or the possibility of reflections from this being large enough to compromise the receiver performance (55, 56).

Alternatively a dedicated test transmitter (59) (FIG. 3) could be used to provide a TDR mechanism in which case, in order to avoid interference with the upstream path, operation of this test transmitter in a very low power mode could be used.

If there is no space in the upstream data format to allow for a correlation window, then adaptive coefficients can be used to eliminate the received signal components, thus providing effectively a decision directed equaliser where the residue is used as the correlator input to determine reflection coefficients, adaptation may employ the well known gradient estimation algorithm.

What is claimed is:

1. An optical transmission system including a data transmitter arranged to transmit a downstream scrambled data sequence, a data receiver, an optical fibre path for carrying transmitted optical signals therebetween, wherein said system incorporates means for retrieving from the transmission path signals including a reflection of the transmitted data sequence from a fault, and signal processing means for correlating said reflection of the transmitted data sequence with a time delayed copy of that data sequence so as to determine from the duration of said time delay a location in the optical fibre path of the fault from which the data sequence has been reflected, whereby the transmitted data sequence provides a test signal for fault detection while the transmission system is in service.

2. A system as claimed in claim 1, wherein said optical path incorporates a bi-directional optical amplifier.

3. A system as claimed in claim 2, wherein said means for retrieving signals from the optical path comprises first and second taps disposed in the optical fibre path on either side of said amplifier.

4. A system as claimed in claim 3, and incorporating means for extracting a lower frequency part of said portion of the transmitted signal and for determining said correlation from said lower frequency part.

5. A system as claimed in claim 4, wherein said optical path carries wavelength division multiplex signals.

6. A system as claimed in claim 5, wherein said path carries signals in forward and reverse directions.

7. A system as claimed in claim 5, wherein said first and second taps are constituted by one or more service taps associated with said amplifier.

8. A system as claimed in claim 7, wherein the means for determining the location of the reflection incorporates means for compensating for the effect of at least a portion of the signals transmitted in the reverse direction so as to reduce interference in the location determination.

9. A system as claimed in claim 8, wherein said portion of the signals transmitted in the reverse direction comprises a frame pattern.

10. A system as claimed in claim 9, wherein said frame pattern is a synchronous frame pattern.

11. A method of determining the location of a fault generating an optical reflection in an optical transmission system including a data transmitter arranged to transmit a downstream scrambled data sequence, a data receiver, an optical fibre path for carrying transmitted optical signals therebetween, the method comprising retrieving from the transmission path signals including a reflection of the transmitted data sequence from the fault, and correlating said reflection of the transmitted data sequence with a time delayed copy of that data sequence so as to determine from the duration of said time delay a location in the optical fibre path of the fault from which the data sequence has been reflected, whereby the transmitted data sequence provides a test signal for fault detection while the transmission system is in service.

12. A method as claimed in claim 11, wherein said correlation is performed on a lower frequency part of said portion of the transmitted signal.

13. A method as claimed in claim 12, and including compensating for the effect of at least a portion of the signals transmitted in the reverse direction so as to reduce interference in the location determination.

14. A method as claimed in claim 13, wherein said portion of the signals transmitted in the reverse direction comprises a frame pattern.

15. Apparatus for determining the location of a fault generating an optical reflection in an optical transmission system including a data transmitter arranged to transmit a downstream scrambled data sequence, a data receiver, an optical fibre path for carrying transmitted optical signals therebetween, the apparatus comprising means for retrieving from the transmission path signals including a reflection of the transmitted data sequence from a fault, and signal processing means for correlating said reflection of the transmitted data sequence with a time delayed copy of that data sequence so as to determine from the duration of said time delay a location in the optical fibre path of the fault from which the data sequence has been reflected, whereby the transmitted data sequence provides a test signal for fault detection while the transmission system is in service.

16. Apparatus as claimed in claim 15, and incorporating a bi-directional optical amplifier disposed, in use, in said transmission path.

17. Apparatus as claimed in claim 16, wherein said means for retrieving signals from the optical path comprises first and second taps disposed in the optical fibre path on either side of said amplifier.

18. Apparatus as claimed in claim 16, and incorporating means for extracting a lower frequency part of said portion of the transmitted signal and for determining said correlation from said lower frequency part.

19. Apparatus as claimed in claim 18, wherein first and second taps means comprises one or more service taps associated with said amplifier.

20. Apparatus as claimed in claim 19, wherein the means for determining the location of the reflection incorporates means for compensating for the effect of at least a portion of the signals transmitted in the reverse direction so as to reduce interference in the location determination.

* * * * *